United States Patent
Thompson et al.

(10) Patent No.: US 7,676,463 B2
(45) Date of Patent: Mar. 9, 2010

(54) INFORMATION EXPLORATION SYSTEMS AND METHOD

(75) Inventors: Kevin B. Thompson, Chicago, IL (US); Matthew S. Sommer, Plano, TX (US)

(73) Assignee: Kroll Ontrack, Inc., Eden Prairie, MN (US)

( * ) Notice: Subject to any disclaimer, the term of this patent is extended or adjusted under 35 U.S.C. 154(b) by 932 days.

(21) Appl. No.: 11/274,435

(22) Filed: Nov. 15, 2005

(65) Prior Publication Data

US 2007/0112755 A1    May 17, 2007

(51) Int. Cl.
G06F 17/30    (2006.01)
G06F 17/00    (2006.01)
(52) U.S. Cl. .............. 707/5; 707/7; 707/104.1
(58) Field of Classification Search ........... 707/102, 707/104.1, 5, 7, E17.089, E17.092
See application file for complete search history.

(56) References Cited

U.S. PATENT DOCUMENTS

| | | | |
|---|---|---|---|
| 5,642,518 A | | 6/1997 | Kiyama et al. |
| 5,819,258 A * | | 10/1998 | Vaithyanathan et al. ........ 707/2 |
| 5,999,927 A * | | 12/1999 | Tukey et al. ................ 707/2 |
| 6,006,221 A * | | 12/1999 | Liddy et al. ................. 707/5 |
| 6,134,532 A * | | 10/2000 | Lazarus et al. .............. 705/14 |
| 6,137,911 A * | | 10/2000 | Zhilyaev .................. 382/225 |
| 6,216,134 B1 * | | 4/2001 | Heckerman et al. ...... 707/104.1 |
| 6,360,227 B1 * | | 3/2002 | Aggarwal et al. ........... 707/102 |
| 6,374,217 B1 * | | 4/2002 | Bellegarda ................ 704/240 |
| 6,408,295 B1 * | | 6/2002 | Aggarwal et al. ............. 707/6 |
| 6,438,539 B1 * | | 8/2002 | Korolev et al. ............... 707/3 |
| 6,446,061 B1 * | | 9/2002 | Doerre et al. ................ 707/3 |
| 6,523,026 B1 * | | 2/2003 | Gillis ..................... 707/3 |
| 6,678,690 B2 * | | 1/2004 | Kobayashi et al. .......... 707/101 |
| 6,742,003 B2 * | | 5/2004 | Heckerman et al. ...... 707/104.1 |
| 6,847,966 B1 * | | 1/2005 | Sommer et al. ............... 707/5 |
| 6,920,450 B2 * | | 7/2005 | Aono et al. .................. 707/3 |
| 7,024,400 B2 * | | 4/2006 | Tokuda et al. .............. 706/56 |
| 7,216,129 B2 * | | 5/2007 | Aono et al. ............... 707/102 |
| 7,219,089 B2 * | | 5/2007 | Kobayashi et al. ............ 707/1 |
| 7,225,184 B2 * | | 5/2007 | Carrasco et al. .............. 707/3 |
| 7,251,637 B1 * | | 7/2007 | Caid et al. ................ 706/15 |
| 7,257,593 B2 * | | 8/2007 | Mazner et al. ............. 707/101 |
| 7,280,957 B2 * | | 10/2007 | Newman et al. .............. 704/9 |
| 7,333,998 B2 * | | 2/2008 | Heckerman et al. ........ 707/101 |
| 7,346,629 B2 * | | 3/2008 | Kapur et al. ............ 707/104.1 |
| 7,356,777 B2 * | | 4/2008 | Borchardt et al. .......... 715/836 |

(Continued)

OTHER PUBLICATIONS

Zamir, Oren Eli, "Clustering Web Documents: A Phrase-Based Method for Grouping Search Engine Results", Doctor of Philosophy Thesis, Univ. of Washington, Dept. of Computer Science and Engineering, © 1999, pp. Intro-1-Intro-6, i-x and 1-192.*

(Continued)

*Primary Examiner*—Robert Stevens
(74) *Attorney, Agent, or Firm*—Conley Rose, P.C.

(57) ABSTRACT

Disclosed information exploration system and method embodiments operate on a document set to determine a document cluster hierarchy. An exclusionary phrase index is determined for each cluster, and representative phrases are selected from the indexes. The selection process may enforce pathwise uniqueness and balanced sub-cluster representation. The representative phrases may be used as cluster labels in an interactive information exploration interface.

26 Claims, 7 Drawing Sheets

U.S. PATENT DOCUMENTS

| | | | |
|---|---|---|---|
| 2002/0024532 A1* | 2/2002 | Fables et al. | 345/700 |
| 2002/0032682 A1* | 3/2002 | Kobayashi et al. | 707/5 |
| 2002/0042793 A1* | 4/2002 | Choi | 707/6 |
| 2003/0018637 A1* | 1/2003 | Zhang et al. | 707/6 |
| 2003/0018652 A1* | 1/2003 | Heckerman et al. | 707/104.1 |
| 2003/0023570 A1* | 1/2003 | Kobayashi et al. | 706/15 |
| 2003/0037073 A1* | 2/2003 | Tokuda et al. | 707/500 |
| 2003/0093411 A1* | 5/2003 | Minor | 707/3 |
| 2003/0144924 A1* | 7/2003 | McGee | 705/27 |
| 2003/0154181 A1* | 8/2003 | Liu et al. | 707/1 |
| 2003/0204484 A1* | 10/2003 | Charpiot et al. | 707/1 |
| 2004/0010485 A1* | 1/2004 | Aono et al. | 707/1 |
| 2004/0068493 A1* | 4/2004 | Kobayashi et al. | 707/3 |
| 2004/0162834 A1* | 8/2004 | Aono et al. | 707/100 |
| 2004/0181554 A1* | 9/2004 | Heckerman et al. | 707/104.1 |
| 2005/0044487 A1* | 2/2005 | Bellegarda et al. | 715/511 |
| 2005/0182764 A1* | 8/2005 | Evans | 707/5 |
| 2005/0222987 A1* | 10/2005 | Vadon | 707/3 |
| 2005/0267872 A1* | 12/2005 | Galai et al. | 707/3 |
| 2006/0026203 A1* | 2/2006 | Tan et al. | 707/104.1 |
| 2006/0101102 A1* | 5/2006 | Su et al. | 707/205 |
| 2006/0106792 A1* | 5/2006 | Patterson | 707/5 |
| 2006/0164409 A1* | 7/2006 | Borchardt et al. | 345/419 |
| 2006/0259481 A1* | 11/2006 | Handley | 707/5 |
| 2007/0078669 A1* | 4/2007 | Dave et al. | 705/1 |
| 2007/0078670 A1* | 4/2007 | Dave et al. | 705/1 |
| 2007/0078671 A1* | 4/2007 | Dave et al. | 705/1 |
| 2007/0078845 A1* | 4/2007 | Scott et al. | 707/5 |
| 2008/0114763 A1* | 5/2008 | Evans | 707/6 |
| 2008/0133567 A1* | 6/2008 | Ames et al. | 707/102 |
| 2008/0201655 A1* | 8/2008 | Borchardt et al. | 715/767 |
| 2008/0306943 A1* | 12/2008 | Patterson | 707/6 |
| 2008/0319971 A1* | 12/2008 | Patterson | 707/5 |

OTHER PUBLICATIONS

Kumar, Sachin, et al., "Personalized Profile Based Search Interface With Ranked and Clustered Display", Technical Report TR 01-023, Univ. of Minnesota, Dept. of CS and Engineering, Minneapolis, MN, Jun. 1, 2001, pp. i-iii and 1-18.*

Chuang, Shui-Lung, et al., "A Practical Web-Based Approach to Generating Topic Hierarchy for Text Segments", CIKM '04, Washington, DC, Nov. 8-13, 2004, pp. 127-136.*

Zhang, Dell, et al., "Semantic, Hierarchical, Online Clustering of Web Search Results", APWeb 2004, LNCS 3007, Springer, Berlin, Germany, Mar. 15, 2004, pp. 69-78.*

Aono, Masaki, et al., "A Method for Query Expansion Using a Hierarchy of Clusters", AIRS 2005, Jeju Island, Korea, Oct. 13-15, 2005, pp. 479-484.*

Skopal, Tomáš, et al., "Metric Indexing for the Vector Model in Text Retrieval", SPIRE 2004, LNCS 3246, Springer, Berlin, Germany, Dec. 7, 2004, pp. 183-195.*

Lee, Kyung-Soon, et al., "Re-ranking Model Based on Document Clusters", Information Processing and Management, vol. 37, Issue 1, Dec. 6, 2000, pp. 1-14.*

Yang, Yiming, et al., "Learning Approaches for Detecting and Tracking News Events", IEEE Intelligent Systems and Their Applications, vol. 14, Issue 4, Jul./Aug. 1999, pp. 32-33.*

Ceglowski, Maciej, et al., "Semantic Search of Unstructured Data Using Contextual Network Graphs", © 2003, pp. 1-11.*

Ishikawa, Yoshiharu, et al., "Mindreader: Querying Databases Through Multiple Examples", Proc. of the 24th VLDB Conf., © 1998, pp. 1-25.*

Hammouda, Khaled M., et al., "Efficient Phrase-Based Document Indexing for Web Document Clustering", IEEE Transactions on Knowledge and Data Engineering, vol. 16, No. 10, Oct. 2004, pp. 1279-1296.*

Zeng, Hua-Jun, et al., "Learning to Cluster Web Search Results", SIGIR '04, Sheffield, South Yorkshire, UK, Jul. 25-29, 2004, pp. 210-217.*

Fung, Benjamin C. M., et al., "Hierarchical Document Clustering Using Frequent Itemsets", SDM 2003, © 2003, Mar. 23-24, 1999, pp. 1-12.*

Xu, Wei, et al., "Document Clustering by Concept Factorization", SIGIR '04, Sheffield, South Yorkshire, UK, Jul. 25-29, 2004, pp. 202-209.*

Bellegarda, Jerome R., "Large Vocabulary Speech Recognition with Multispan Statistical Language Models", IEEE Transactions on Speech and Audio Processing, vol. 8, No. 1, Jan. 2000, pp. 76-84.*

Steinbach, Michael, et al., "A Comparison of Document Clustering Techniques," Department of Computer Science and Engineering, University of Minnesota, 20 pgs., (c) 2000.

Zamir, Oren, et al., "Grouper: A Dynamic Clustering Interface to Web Search Results," Department of Computer Science and Engineering, University of Washington, 15 pgs., Computer Networks, vol. 31, No. 11, May 1999.

Zamir, Oren, et al., "Web Document Clustering: A Feasibility Demonstration," Department of Computer Science and Engineering, University of Washington, 9 pgs., (c) 1998.

International Search Report and Written Opinion from related counterpart application Serial No. PCT/US06/44367, dated Jul. 22, 2008, 11 pgs.

* cited by examiner

| PHRASE | DOCS | SCORE |
|---|---|---|
| CAT ATE | B, I | 1.06 |
| ATE CHEESE | B, D | 1.06 |
| ATE | B, D, I | 1.00 |
| CHEESE | B, D | 0.67 |
| MOUSE | D, I | 0.67 |
| TOO | D, I | 0.67 |

| PHRASE | LEAVES | SCORE |
|---|---|---|
| FIRST SHOT | I,II,III,IV | 1.06 |
| SECOND BASE | I,III,V,VII | 1.06 |
| THIRD DEGREE | II,IV,VI,VII | 1.06 |
| FOURTH AVE | II,III,IV | 0.79 |
| FIFTH GRADE | V,VI,VII | 0.79 |
| SIXTH STREET | I,II | 0.53 |
| SEVENTH DAY | I,II | 0.53 |
| EIGHTH PARTY | I,III | 0.53 |
| NINTH GATE | I,V | 0.53 |
| TENTH TIME | II,III | 0.53 |
| ELEVENTH EVE | II,IV | 0.53 |
| TWELFTH TREE | II,VII | 0.53 |
| THIRTEENTH | III,VI | 0.33 |
| FOURTEENTH | III,VII | 0.33 |
| ⋮ | ⋮ | ⋮ |

US 7,676,463 B2

INFORMATION EXPLORATION SYSTEMS AND METHOD

CROSS-REFERENCE TO RELATED APPLICATIONS

The present application relates to U.S. Pat. No. 6,847,966, "Method and System for Optimally Searching A Document Database Using a Representative Semantic Space", filed Apr. 24, 2002, by inventors Matthew Sommer and Kevin Thompson, and hereby incorporated herein by reference.

BACKGROUND

Information commonly comes in large quantities. In many cases, such as published reference works, cataloged library systems, or well-designed databases, the information is organized and indexed for easy information retrieval. In many other cases, such as litigation discovery, personal document collections, electronic records on local networks, and internet search results (to name just a few), the information is poorly organized and not indexed at all, making it difficult to locate and retrieve desired information.

In the past, information providers have scanned documents or otherwise obtained documents in electronic form and have applied automated searching techniques to aid users in their quest for information. Generally, such information providers employ term searching with Boolean operations (AND, OR, and NOT). Though computationally efficient, this automated searching technique suffers from a number of drawbacks. The primary drawback is the sensitivity of the search results to the choice of search terms. In a body of documents, the sought-after information may be hidden by its use of synonyms, misspellings, and different word forms (e.g., ice, iced, ices, icing, deice, re-ice, . . . ). A second major drawback is this search technique's failure to discern differences in term usage, and consequently this search technique returns a large percentage of irrelevant results (e.g., "icing" refers to frost formation, a sugared cake topping, and a hockey penalty).

These drawbacks can usually be overcome by a person having great familiarity with the information being sought, e.g., by structuring a query using terms commonly used in the sought-after document's subject area. Unfortunately, such familiarity is commonly not possessed by the searcher. Accordingly, information providers seek alternative searching techniques to offer their users. A searching technique would greatly benefit such information providers if it enabled users to find their desired information without necessitating some preexisting degree of familiarity with the sought after information or the searching tool itself.

BRIEF DESCRIPTION OF THE DRAWINGS

A better understanding of the various disclosed embodiments can be obtained when the following detailed description is considered in conjunction with the following drawings, in which.

Figure 1:
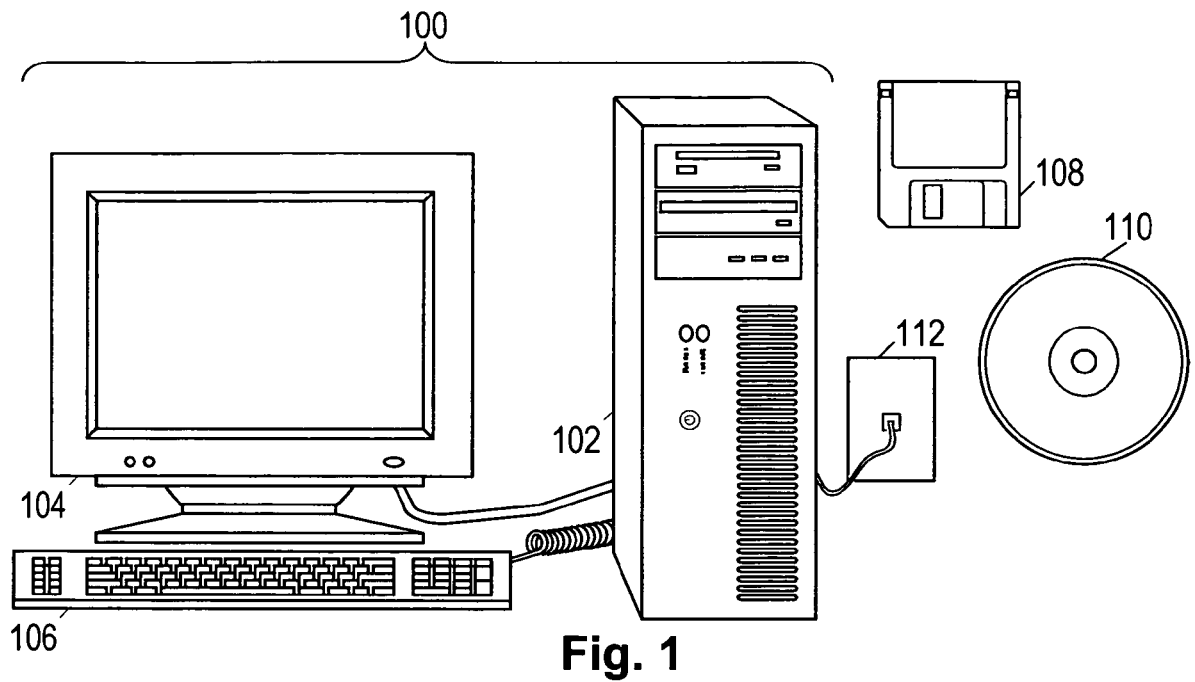
FIG. 1 shows an illustrative information exploration system embodied as a desktop computer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

TERMINOLOGY

In the following discussion and in the claims, the terms "including" and "comprising" are used in an open-ended fashion, and thus should be interpreted to mean "including, but not limited to . . . ".

Also, the term "couple" or "couples" is intended to mean either an indirect or direct electrical connection. Thus, if a first device couples to a second device, that connection may be through a direct electrical connection, or through an indirect electrical connection via other devices and connections.

The term "set" is intended to mean one or more items forming a conceptual group. The term "phrase" is intended to mean a sequence of one or more words. The term "document" refers to a set of phrases. The term "cluster" is intended to mean a set of documents grouped on the basis of some similarity measure.

DETAILED DESCRIPTION

Information exploration methods and systems are disclosed herein. In some embodiments, these methods and systems take a set of documents and determine a hierarchy of clusters representing various document subsets. The clusters are labeled with phrases that identify themes common to the documents associated with the cluster. The cluster set's hierarchical nature enables a user to explore document set information at many levels. For example, a root cluster is labeled with phrases representing themes or characteristics shared by the document set as a whole, and subordinate clusters are labeled with phrases representing themes or characteristics that unify significant document subsets. By exploring the document set's themes and characteristics in a progression from general to specific, a user becomes familiarized with the document set in a fashion that efficiently guides the user to sought-after information. In other embodiments and variations, themes and characteristics representative of a selected document set are determined for a user in a dynamic, set-by-set fashion as the user identifies a document set of possible interest. These dynamic embodiments enable a user to quickly discern whether a selected document set is worthy of further analysis or not.

FIG. 1 shows an illustrative system 100 for information exploration. System 100 is shown as a desktop computer 100, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, illustrative system 100 comprises a chassis 102, a display 104, and an input device 106. The chassis 102 comprises a processor, memory, and information storage devices. One or more of the information storage devices may store programs and data on removable storage media such as a floppy disk 108 or an optical disc 110. The chassis 102 may further comprise a network interface that allows the system 100 to receive information via a wired or wireless network, represented in FIG. 1 by a phone jack 112. The information storage media and information transport media (i.e., the networks) are collectively called "information carrier media."

The chassis 102 is coupled to the display 104 and the input device 106 to interact with a user. The display 104 and the input device 106 may together operate as a user interface. The display 104 is shown as a video monitor, but may take many alternative forms such as a printer, a speaker, or other means for communicating information to a user. The input device 106 is shown as a keyboard, but may similarly take many alternative forms such as a button, a mouse, a keypad, a dial, a motion sensor, a camera, a microphone or other means for receiving information from a user. Both the display 104 and the input device 106 may be integrated into the chassis 102.

Figure 2:
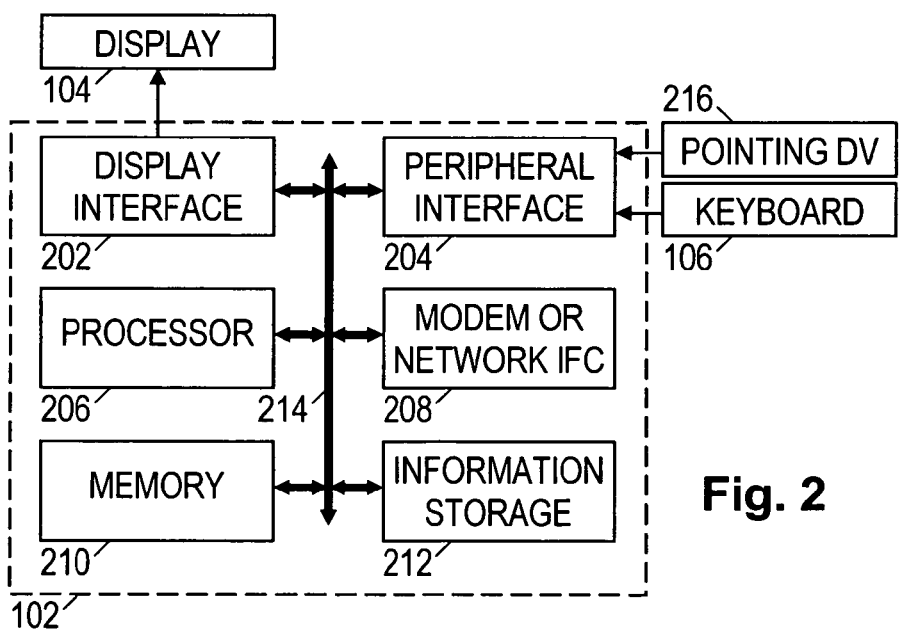
FIG. 2 shows a block diagram of an illustrative information exploration system.

FIG. 2 shows a simplified functional block diagram of system 100. The chassis 102 may comprise a display interface 202, a peripheral interface 204, a processor 206, a modem or other suitable network interface 208, a memory 210, an information storage device 212, and a bus 214. System 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

The processor 206 gathers information from other system elements, including input data from the peripheral interface 204, and program instructions and other data from the memory 210, the information storage device 212, or from a remote location via the network interface 208. The processor 206 carries out the program instructions and processes the data accordingly. The program instructions may further configure the processor 206 to send data to other system elements, comprising information for the user which may be communicated via the display interface 202 and the display 104.

The network interface 208 enables the processor 206 to communicate with remote systems via a network. The memory 210 may serve as a low-latency temporary store of information for the processor 206, and the information storage device 212 may serve as a long term (but higher latency) store of information.

The processor 206, and hence the computer 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from information the storage device 212 or may be retrieved from remote locations via the network interface 208. One or more of these programs configures system 100 to carry out at least one of the information exploration methods disclosed herein.

Figure 3:
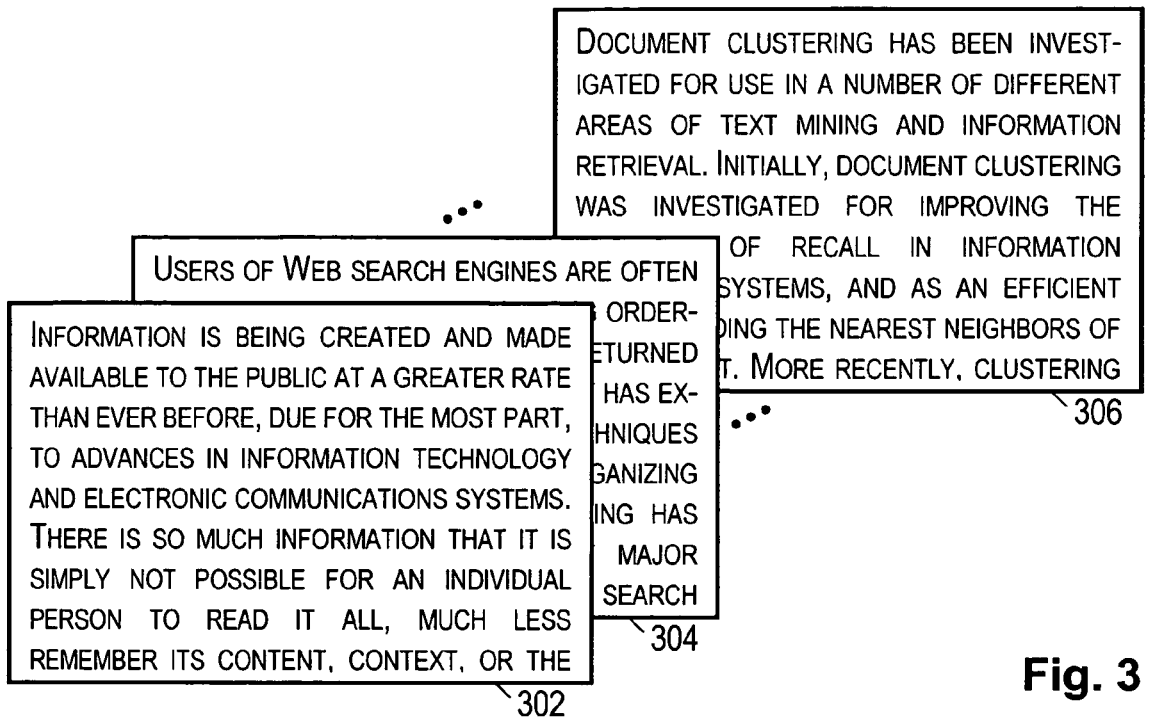
FIG. 3 shows an illustrative set of documents.

FIG. 3 shows an illustrative set of documents 302-306. The document set can originate from anywhere. Examples include internet search results, snippets from internet search results, electronic database records, and text document files. Each document includes one or more "sentences", i.e., one or more groups of words separated by punctuation or some other form of semantic separators. It is contemplated that the document set as a whole may be large, i.e., more than 1,000 documents, and potentially may include millions of documents. With such document sets, the disclosed information exploration methods are expected to greatly reduce the time required for a user to become familiar with the general contents of the document set, as well as the time required for a user to locate a particular document of interest or documents containing information on a particular topic of interest.

In various embodiments, the disclosed information exploration methods employ clustering techniques to group similar documents together. Many such clustering techniques exist and may be employed. Examples of suitable clustering techniques include suffix tree clustering (see, e.g., O. Zamir and O. Etzioni, "Web Document Clustering: A Feasibility Demonstration", SIGIR'98 Proceedings pp 46-54), agglomerative hierarchical clustering, divisive hierarchical clustering, K-means clustering, bisecting K-means clustering (see, e.g., M. Steinbach, et al., "A Comparison of Document Clustering Techniques", Technical Report #00-034, Univ. of Minnesota), Buckshot, Fractionation (see, e.g., D. R. Cutting, et al., "Scatter/Gather: a cluster-based approach to browsing large document collections", SIGIR'92 Proceedings pp 318-329). Each of the foregoing references is hereby incorporated by reference.

Each of the foregoing clustering technique examples (except perhaps suffix tree clustering) can employ a variety of similarity measures to evaluate the "distance" or dissimilarity between any two documents. The similarity measures may be based on term frequency vectors (see, e.g., M. Steinbach, et al., cited previously), concept-space vectors, and other representations. However, clustering quality is an important consideration for the success of the disclosed information exploration methods. Clustering quality has been found to be significantly better when latent semantic analysis (LSA) principles are applied to obtain concept-space vectors. LSA-based clustering methods establish a relationship between documents in a document set and points in a high-dimensional concept space.

As described in U.S. Pat. No. 6,847,966, "Method and System for Optimally Searching a Document Database Using a Representative Semantic Space", document-to-concept space relationship can be established by applying singular value decomposition to a terms-to-document matrix. Briefly summarized, a terms-to-documents matrix is created having a row for each term and a column for each document. (Pervasive terms such as "the", "and", "in", "as", etc., may be eliminated from consideration.) Each matrix element is the number of times that row's term can be found in that column's document. In some embodiments, each row of the matrix is multiplied by a weighting factor to account for the discriminating power of different terms. For example, the weighting factor may be the term's inverse document frequency, i.e., the inverse of the number of documents in which that term appears. The term-to-document A matrix is then decomposed using singular value decomposition into three matrices: a term-to-concept matrix T, a diagonal matrix S, and a concept-to-document matrix $D^T$:

$$A = TSD^T \quad (1)$$

Each column of the concept-to-document matrix $D^T$ provides the concept-space vector for a corresponding document. Once the term-to-concept matrix T, and the diagonal matrix S, have been established, the document-to-concept space relationship can be expressed:

$$d^T = S^{-1}T^T a, \quad (2)$$

where a is a column vector of term frequencies, i.e., the elements are the number of times that row's term appear in a given document, and $d^T$ is a resulting column vector of concept coordinates, i.e., the concept space vector for the given document. In embodiments having weighting factors for the elements of the term-to-document matrix A, those weighting factors are also applied to the column vector a. The relationship given by equation (2) can be applied to documents that were not in the set of documents used to derive the matrices S and T, although the concept-space vector may need to be normalized. The term "pseudo-document vector" is herein used to refer to those concept-space vectors calculated for documents not in the original set of documents used to derive the S and T matrices. For further details, refer to U.S. Pat. No. 6,847,966, which is hereby incorporated by reference.

Figure 4:
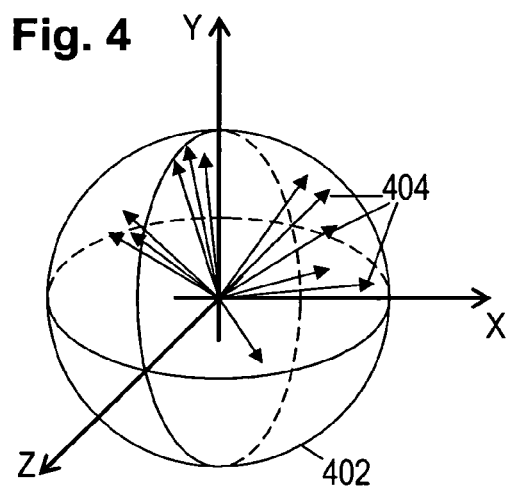
FIG. 4 shows an illustrative set of documents represented as vectors in a three dimensional concept space.

FIG. 4 shows an illustrative document set in a concept space. Three perpendicular axes are shown (X, Y, and Z), each axis representing a different concept. A unit sphere 402 (i.e., a sphere of radius 1) is shown centered at the origin. Also shown is a plurality of concept-space vectors 404, which may include one or more pseudo-document vectors. Each of the vectors 404 is normalized to have unit length, meaning that each vector 404 is drawn from the origin to a point on unit sphere 402. Each of the vectors 404 is derived from a corresponding document in the document set, with the vector's direction representing some combination of the concepts represented by the illustrated axes. Although only three dimensions are shown, it is expected that in practice many more dimensions will be used.

Clustering techniques seek to group together documents concerning similar concepts. In concept space, documents concerning similar concepts should be represented by vectors having similar orientations. Document similarity may thus be measured by determining the inner ("dot") product of the documents' concept space vectors. The dot product of two unit vectors equals the cosine of the angle between the vectors, meaning that aligned ("similar") concept vectors have a similarity of 1, while oppositely-aligned concept vectors have a similarity of −1. Other document similarity measures exist and may be employed. For examples of other similarity measures, see U.S. Pat. Nos. 5,706,497, 6,633,868, 6,785,669, and 6,941,321, which are hereby incorporated herein by reference.

Figure 5:
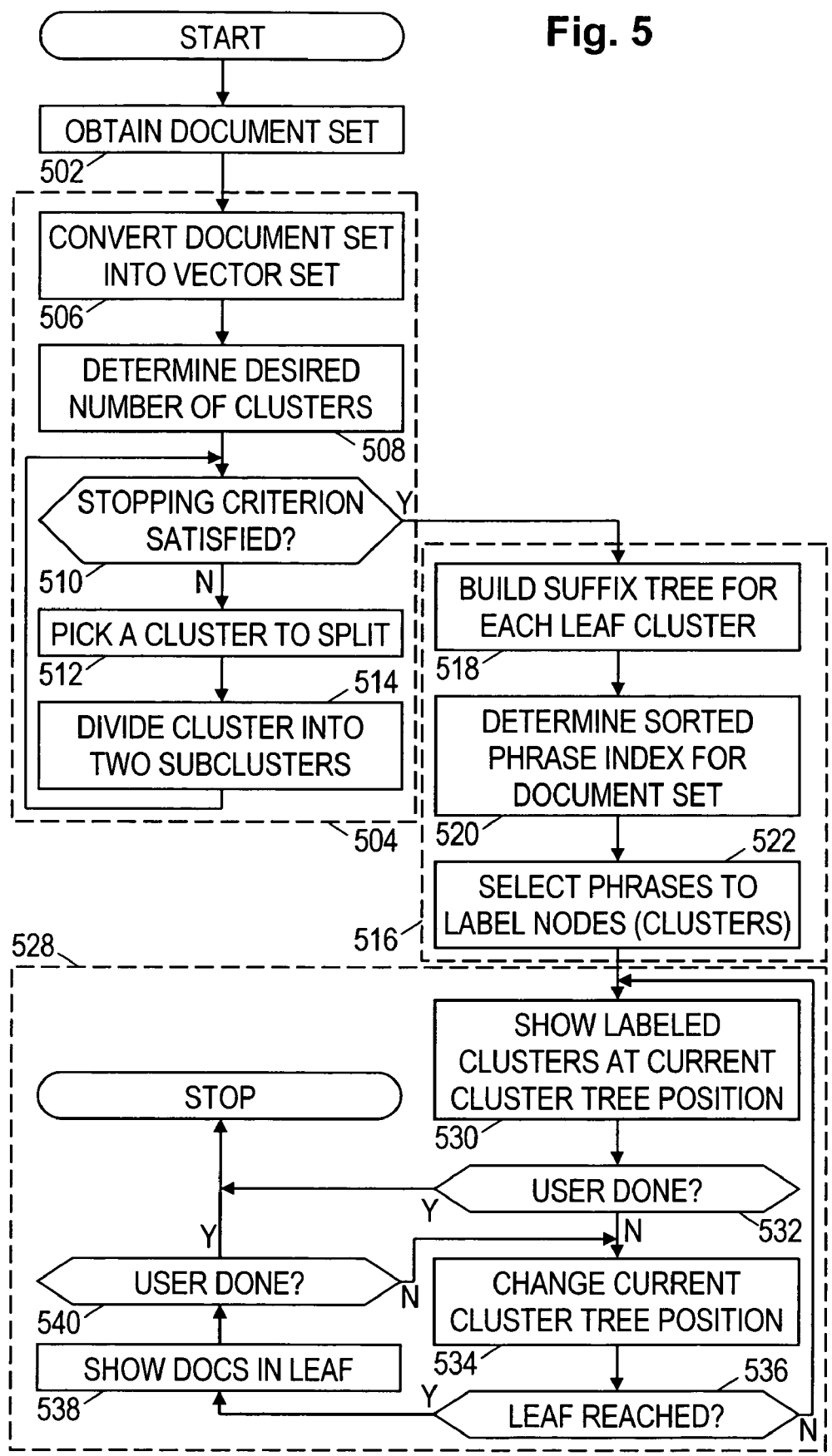
FIG. 5 shows a flow diagram of an illustrative information exploration method.

FIG. 5 shows an illustrative information exploration method that may be implemented by information exploration system 100. The method comprises four phases: obtaining the documents 502, clustering the documents 504, labeling the clusters 516, and exploring the document set 528. The method begins with block 502, in which the document set is obtained or otherwise made accessible. The documents may be obtained and processed incrementally, meaning that the operations represented by block 502 continue to occur even as the operations represented by subsequent processing blocks are initiated. Moreover, various processing operations described below may be serialized or parallelized. For example, the labeling operations 516 may be completed before exploration operations 528 are initiated. Alternatively, various labeling operations 516 and exploration operations 528 may occur concurrently. (When parallelized, the information exploration process may exploit available computational resources more effectively at the cost of added programming complexity.)

The illustrated clustering operations 504 begin with block 506, which represents the information exploration system's conversion of documents into concept-space vectors. The conversion relationship may be predetermined from a representative document set, or the relationship may be calculated anew for each document set. The relationship may be determined using singular value decomposition in accordance with equation (1), and applied in accordance with equation (2).

In block 508, the information exploration system 100 determines a number of clusters. This number may be determined in a variety of ways such as having a predetermined number, or a number based on a distribution of the document vectors. In some preferred embodiments, the number is determined from the size of the document set, and chosen to predispose the final clusters to have a predetermined target size. For example, a target cluster size may be chosen, such as 100 documents per cluster. The size of the document set may then be divided by the target cluster size and rounded up or down to obtain a number of clusters. Alternatively, the number of clusters may be chosen as a function of the number of concept space dimensions, e.g., 2d or $2^d$, where d is the number of concept space dimensions. As yet another alternative, the target cluster size may be allowed to vary as a nonlinear function of the document set size, so that the number of clusters is (e.g.)

$$n = \lceil N/(1 + \log_2 N) \rceil, \quad (3)$$

where N is the document set size.

In the illustrated clustering operations 504, a bisecting K-means clustering technique is employed. Initially, the document set is treated as a single cluster. In block 510, the current number of clusters is compared to the desired number of clusters to determine whether the clustering operations are complete. Other stopping criteria may be used in addition, or alternatively to, the number of clusters. For example, the clustering operations may be considered complete if the average clustering error falls below a predetermined threshold. One possible definition for average clustering error is:

$$\bar{E} = \frac{1}{N} \sum_{k \in C} \sum_{i \in k} \| d_i^T - \bar{d}_k^T \|^2, \quad (4)$$

where C is the set of clusters, $\bar{d}_k^T$ is the average concept-space document vector for cluster k (hereafter termed the "mean cluster vector"), and $d_i^T$ is the ith concept-space document vector in cluster k.

In block 512, the information exploration system 100 selects a cluster to be divided. In some embodiments, the largest undivided cluster is selected for division. In other embodiments, the cluster with the largest clustering error is selected. As the loop iterates, the clusters are iteratively split and split again until the stopping criterion is met.

In block 514, the selected cluster is processed to determine two sub-clusters. The sub-clusters may be determined using a K-means algorithm. The determination involves the random selection of two members of the original cluster as "seeds" for the sub-clusters. Since the initial sub-clusters have only one document vector, the mean cluster vector for the sub-clusters equals the corresponding document vector. Each of the remaining members of the original cluster are in turn compared to the mean cluster vectors and grouped into the sub-cluster with the closest mean cluster vector. The mean cluster vector is updated as each new vector is grouped with the sub-cluster. Once each document vector has been processed, a tentative division of the original cluster has been determined. This process may be repeated multiple times, and the various resulting tentative divisions may be compared to determine the "best" division. The determination of a best division may be based on sub-cluster sizes, with more equal sizes being preferred. Alternatively the determination of best division may be based on average clustering error, with the smallest error being preferred. In some embodiments, the first tentative division is accepted if the disparity in sizes is no greater than 1:4. If the disparity is too great, the process is repeated to obtain a different tentative division of the cluster.

Once a tentative division is accepted, the original cluster is replaced with its two sub-clusters (although the original cluster is stored away for later use). The information exploration system repeats blocks 510-514 until the stopping criterion is met. The iterative subdividing of clusters creates a hierarchy of clusters as illustrated by FIG. 6A.

Figure 6A:
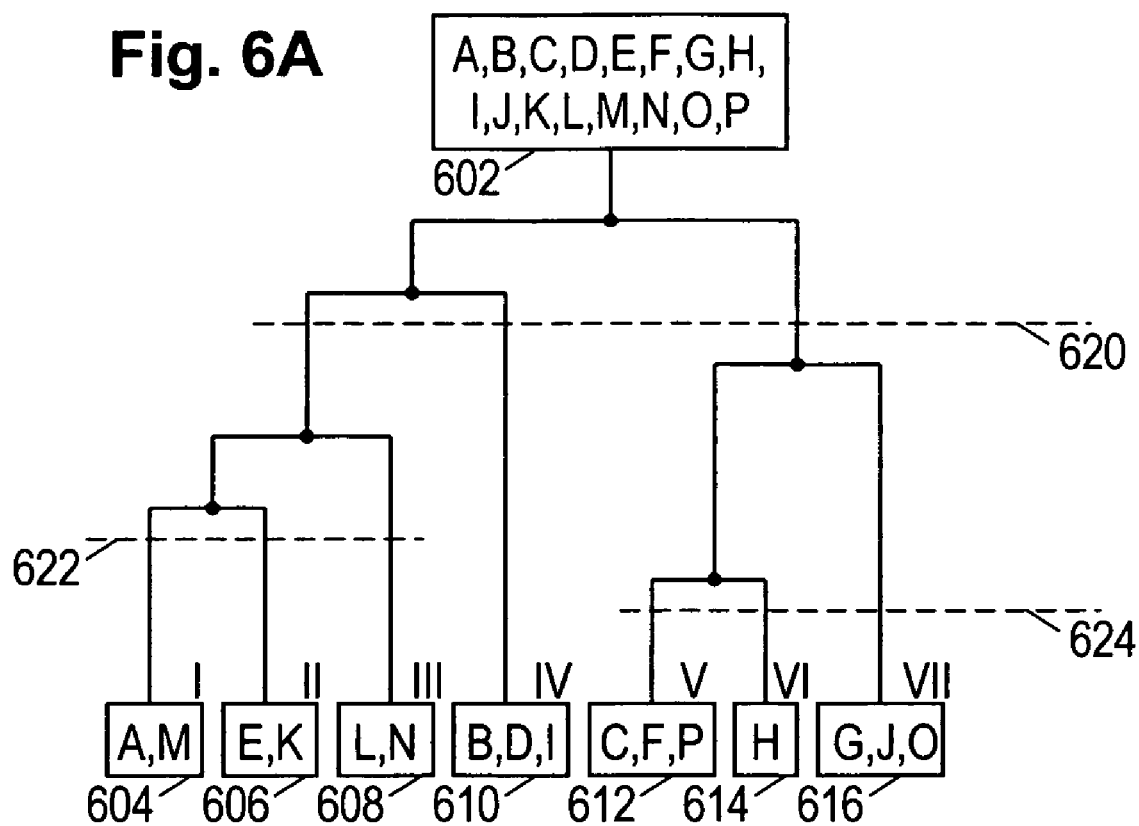
FIG. 6A shows an illustrative hierarchy of clusters in dendrogram form.

FIG. 6A shows an illustrative hierarchy of clusters in which a document set 602 is iteratively subdivided to obtain leaf clusters 604-616 (also identified by roman numerals I-VII). In the document set and the leaf clusters, letters A through P are used to represent documents. (Note that intermediate clusters can be reconstructed by combining leaf clusters as shown by the branches.) The cluster selection rule for this example is to select the largest remaining cluster, and the stopping criterion was that the largest cluster would have less than four documents. After the first division, the original cluster has been divided into {A,B,D,E,I,K,L,M,N} and {C,F,G,H,J,O,P}. The larger of these two clusters is then divided. At the stage identified by line 620, three clusters exist: {A,E,K,L,M,N}, {B,D,I}, and {C,F,G,H,J,O,P}. The third of these is now the largest cluster, so it is next to be subdivided.

The repeated two-way divisions produce a binary clustering tree (i.e., each intermediate node has two children). However, the divisions occur in a sequential manner, meaning that any number of children can be identified for each intermediate node. For example, a ternary clustering tree can be constructed in the following way: the first two divisions of the original document data set produces three sub-clusters, as indicated by line 620. The first of these sub-clusters, after being divided twice, produces another three sub-clusters as indicated by line 622. The second original sub-cluster 610 is a leaf node, and has no children. The third original sub-cluster is divided twice, producing another three sub-clusters as indicated by line 624. Replacing lines 620-624 with nodes, the ternary tree shown in FIG. 6B results.

The desired branching factor for the cluster set hierarchy can be adjusted by moving lines 620-624 upwards or downwards along the tree (assuming enough divisions have been made to reach the desired branching factor). Thus the original binary cluster hierarchy can be converted into a ternary-, quaternary-, or n-ary cluster hierarchy. This configurability can be exploited in the exploration phase described further below.

Returning to FIG. 5, the illustrated cluster labeling operations 516 begin in block 518 with the construction of a suffix tree for each of the leaf clusters. A suffix tree is a data structure that is useful for the construction of a phrase index (block 520). A "true" suffix tree is an agglomeration of paths beginning at the root node and progressing branch-by-branch into the tree. Each branch represents one or more words. A path is defined for each sentence in the document set and for each suffix of those sentences. (A five-word sentence has four suffixes: the last four words of the sentence, the last three words of the sentence, the last two words of the sentence, and the last word of the sentence.) Every node of the suffix tree, except for the root and leaf nodes, has at least two children. If a node does not have two children, the node is eliminated and the word(s) associated with the links to and from the node are joined to form a multi-word phrase.

Before giving an example of a suffix tree, some slight simplifications will be discussed. The branching factor for a suffix tree can be quite high, leading to a potentially very large data structure. To improve the system performance, documents may be "cleaned" before being built into the suffix tree. The cleaning involves eliminating "stop words", i.e., any words in a predefined set of words. The predefined set includes pervasive words (such as "a", "an", "the"), numbers ("1", "42"), and any other words selected by the system designer as not being helpful. The cleaning further involves "stemming", a process in which word stems are retained, but prefixes and suffixes are dropped. Stemming makes "walk", "walker", "walking" equivalent. Throughout the cleaning process, the position of a given term in the original document is stored for later use. As another simplification, the suffix tree depth is preferably limited to a predetermined maximum (e.g., a maximum of six branches from the root). Taken together, these simplifications preserve feasibility without a significant performance sacrifice.

Figures 7A, 7B, 8:
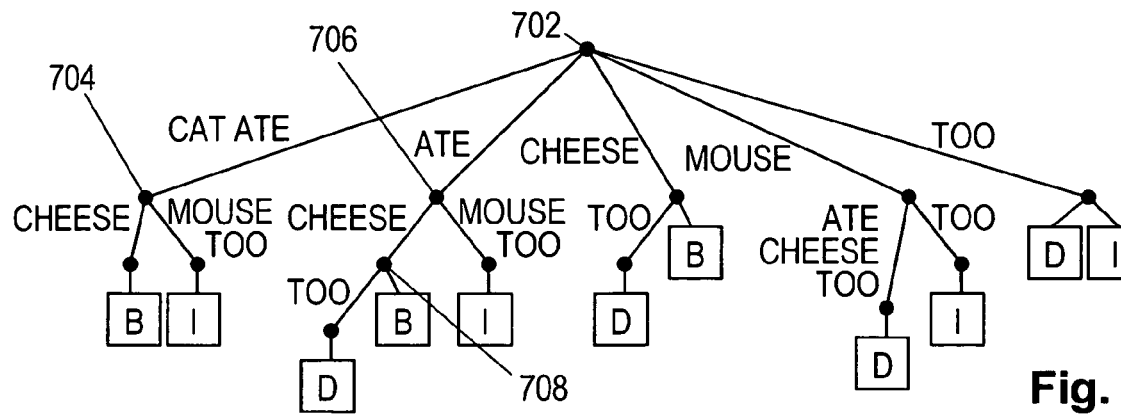
FIG. 7A shows an illustrative suffix tree.
FIG. 7B shows an illustrative phrase index derived from the suffix tree of FIG. 7A.
FIG. 8 shows an illustrative phrase-to-leaf index.

FIG. 7A shows an illustrative suffix tree determined for a document set having three documents {B,D,I}, each with a single sentence:
B: "cat ate cheese"
D: "mouse ate cheese too"
I: "cat ate mouse too"

Document B has one sentence and two suffixes, each having a corresponding path in the suffix tree. The three paths begin at the root node 702, and end at a node labeled by a "B" in a square. For example, beginning at node 702, taking the branch labeled "cat ate" to node 704, followed by the branch labeled "cheese" reaches the "B" in the lower left corner. As another example, beginning at node 702 and taking the branch labeled "ate" to node 706, followed by the branch "cheese" yields a suffix path that reaches the second "B" four squares from the left of the figure. Similar paths can be found for the sentences and suffixes in documents D and I too.

The suffix tree represents a phrase index. Each node (other than the root node) having at least two different documents (i.e., squares) in its descendants represents a phrase that is common to two or more documents. Thus node 704 represents the phrase "cat ate", which appears in documents B and I. Node 706 represents the phrase "ate", which appears in all three documents. Node 708 represents the phrase "ate cheese", which appears in documents B and D. These and other shared phrases are shown in the illustrative phrase index of FIG. 7B.

FIG. 7B shows an illustrative master phrase index having all shared phrases from the document set {B,D,I}. The phrase index may be determined from a suffix tree as described above or it may be determined through other means including, e.g., a suffix array. In practice, the phrase index can get quite lengthy, and accordingly, the phrase indices that are determined for the leaf clusters in practicing various disclosed method embodiments may include only phrases that occur in some minimum number of documents of the corresponding leaf cluster. In block 520 of FIG. 5, the information exploration system 100 constructs a master phrase-to-leaf cluster index by combining the phrase indices for each leaf cluster. For each phrase, the system 100 identifies the leaf clusters containing that phrase. Although it is not strictly necessary, the phrase index may also include an indication of one or more documents and positions within the original documents where the phrase appears. Also for each phrase, the phrase index includes a score determined by system 100. Different scoring strategies may be employed. In some embodiments, the score is a product of the phrase's coverage (the fraction of documents in which it appears), and a logarithm of the phrase's length. For example, the scores given in FIG. 7B are determined in accordance with:

$$\text{Score} = (m/N)\log_2 L, \quad (5)$$

where m is the number of documents in which the phrase appears, N is the number of documents in the document set, and L is the number of words in the phrase.

In block 520 of FIG. 5, the master phrase index is sorted by score. FIG. 8 shows an example of a sorted phrase-to-leaf index for the cluster hierarchy shown in FIG. 6A. In block 522, the information exploration system 100 iterates through the nodes in cluster hierarchy, selecting representative phrases from the master phrase index to label each node. In at least some embodiments, the label selection strategy produces multi-phrase labels that include only phrases that do not appear in sibling clusters. For example, node 622 in FIG. 6A includes only documents in leaf clusters I, II, and III. Thus any phrase that the index indicates as appearing in leaf clusters IV, V, VI, or VII, would not be selected as a label for node 622. (Note that in some embodiments the phrase index construction method may disregard a phrase's appearance in some leaf clusters if that phrase appears in less than some predetermined number of documents. Accordingly, this exclusionary principle may not be absolute.) The representative phrases are used to label the clusters during exploration operations 528.

In some alternative embodiments, the information exploration system 100 may determine a node-specific score for each of the phrases in the master phrase index. This operation is optional, but may be desirable if it is desired to determine which phrase is most descriptive of the cluster. Though the score determined in equation (5) provides some indication of how representative the phrases are of the cluster, node-specific scoring strategies may be preferred. For example, the phrases may be converted into concept-space document vectors using equation (2), and scored in accordance with the phrase vector's similarity to the cluster centroid, e.g., the average document vector for the cluster. (This similarity may be termed the phrase-vector-to-cluster-centroid similarity.) Further details of labeling strategies for block 522 are disclosed below in the description of FIG. 9.

Figure 6B:
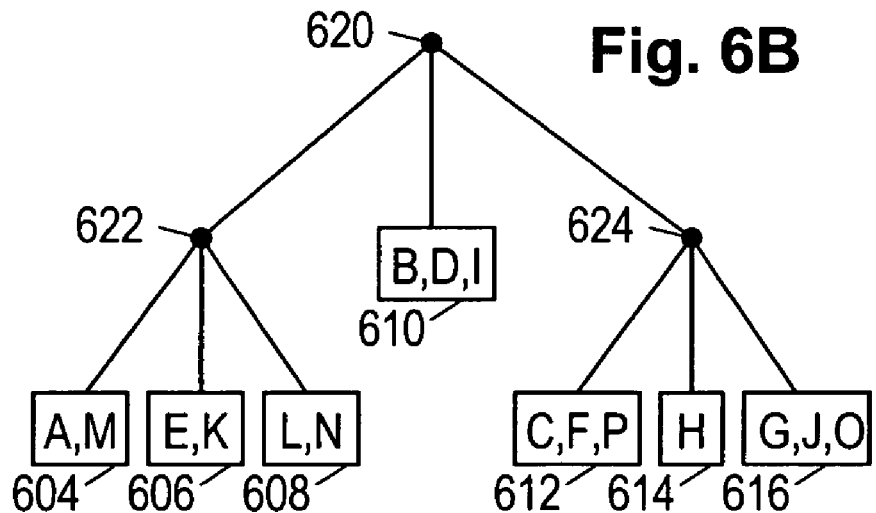
FIG. 6B shows an illustrative clustering tree with a branching factor of three.

Exploration operations 528 begin at the root of the clustering tree (e.g., node 620 of FIG. 6B). In block 530, the information exploration system 100 displays representative phrases for the clusters at the current position in the clustering tree. Initially, a single root cluster would be displayed as a label comprising the representative phrases for that cluster. In block 532, the information exploration system 100 processes user input. Expected user input includes a termination command and selection of a different node in the clustering tree. A termination command causes the information exploration operations 528 to halt. Otherwise, in block 534, the information exploration system changes the current position in the clustering tree, and in block 536, the information exploration system determines whether the current position is a leaf node. If not, the information exploration system returns to block 530.

If a leaf node has been reached, then in block 538, the information exploration system 100 shows a list of titles of the documents in the cluster, and allows the user to examine (in a separate window) the contents of documents selected by the user. In block 540, the information exploration system 100 determines whether user input is a termination command or a position change. As before, a termination command halts the exploration operations 528, and a position change sends the information control system 100 back to block 534.

Figure 10A:
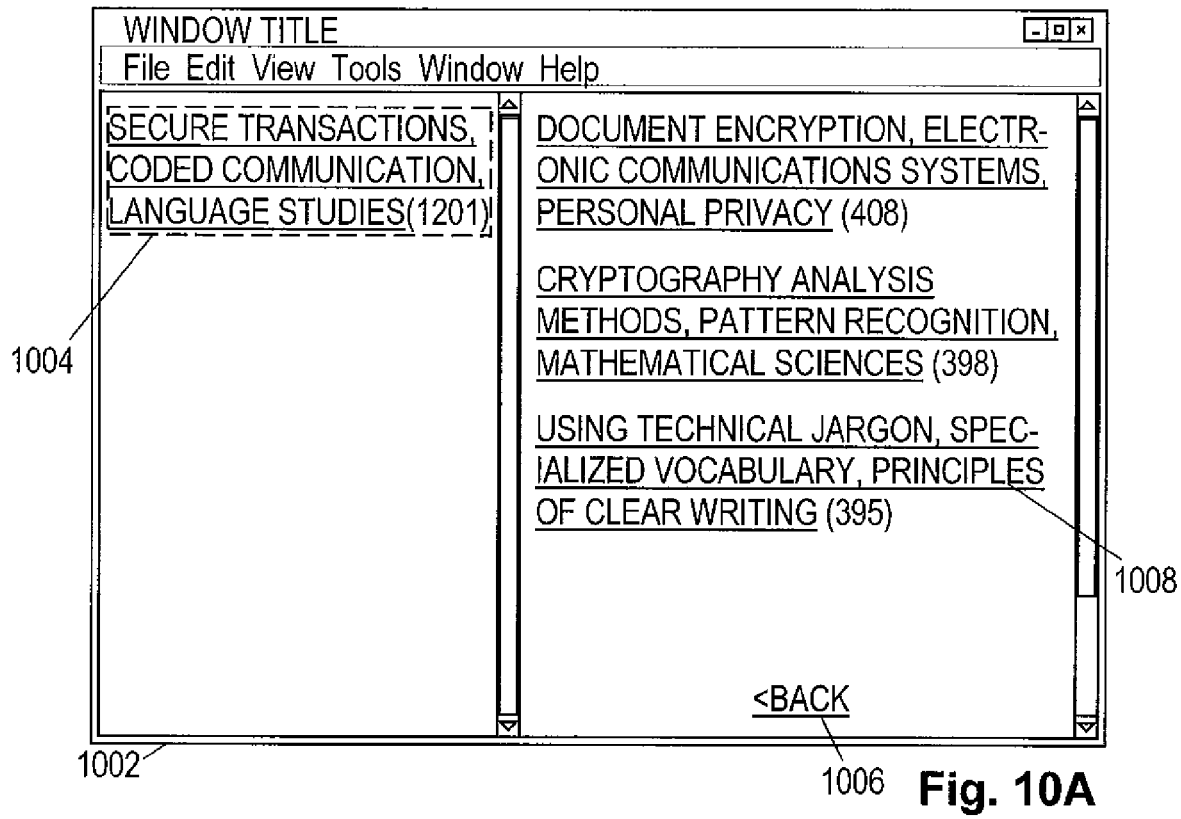
FIGS. 10A and 10B show an illustrative information exploration interface.
Figure 10B:
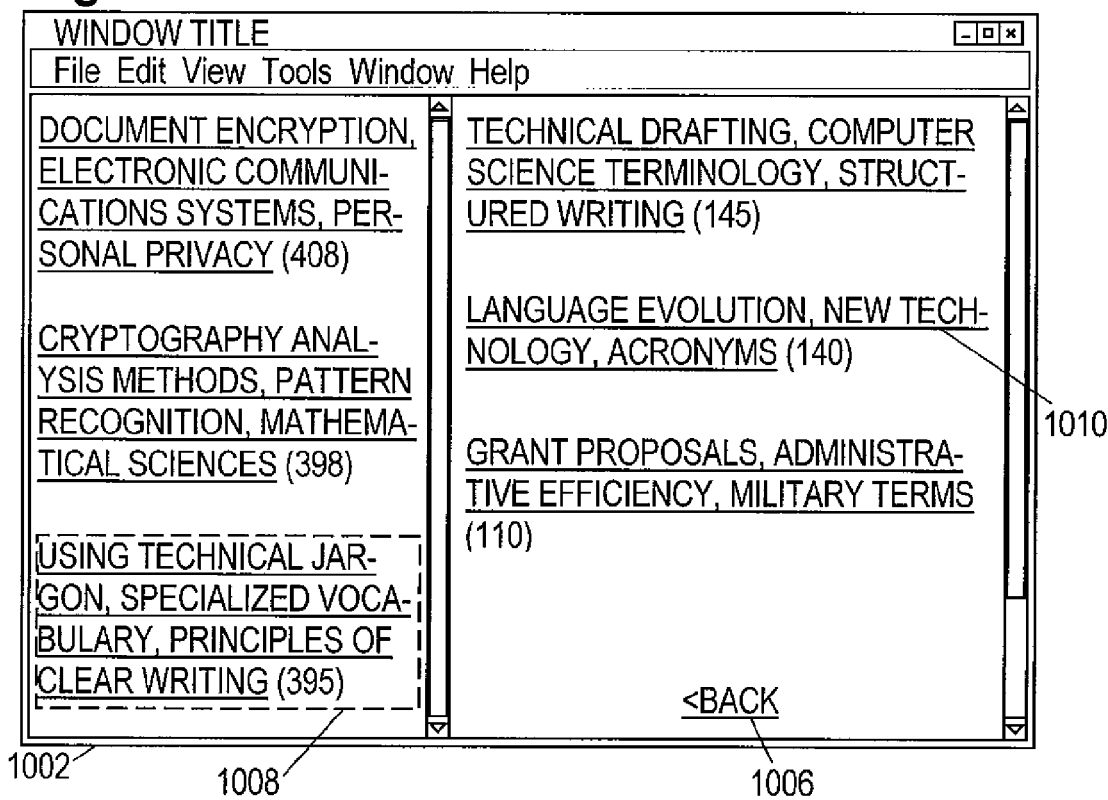

Illustrative display screens are shown in FIGS. 10A and 10B. In FIG. 10A, display screen 1002 shows a label 1004 representing a root cluster. Label 1004 appears on the left ("sibling") side of display screen 1002. When a user selects label 1004 (or any other labels on the sibling side of the screen), the right ("child") side of the display screen shows labels representing the sub-clusters of the selected cluster, and a "Back" link 1006. When a user selects a label (e.g., label 1008) on the child side of the display screen, the contents of the child side of the screen are transferred to the sibling side of the screen, and the sub-clusters of the selected cluster are shown on the child side of the display. FIG. 10B shows an example of display 1002 after label 1008 has been selected. If the selected cluster has no sub-clusters (e.g. label 1010) (i.e., the selected cluster is a leaf node), the information exploration system 100 shows on the right side of the display a list of document titles for the selected cluster.

Except when the current position is the root node, the "Back" link 1006 causes information exploration system 100 to transfer the contents of the sibling side of the display to the child side of the display, and to display the selected cluster's parent cluster and siblings of the parent cluster. When the current position is the root node, the Back link 1006 causes the root node to be de-selected and clears the child side of the display.

Though cluster quality is important, the quality of the cluster labels is often even more important to the user. The representative phrases should, at a glance, give the user some understanding of what documents are to be found in the cluster. Some sophistication can therefore be justified in the selection process represented by block 526.

Figure 9:
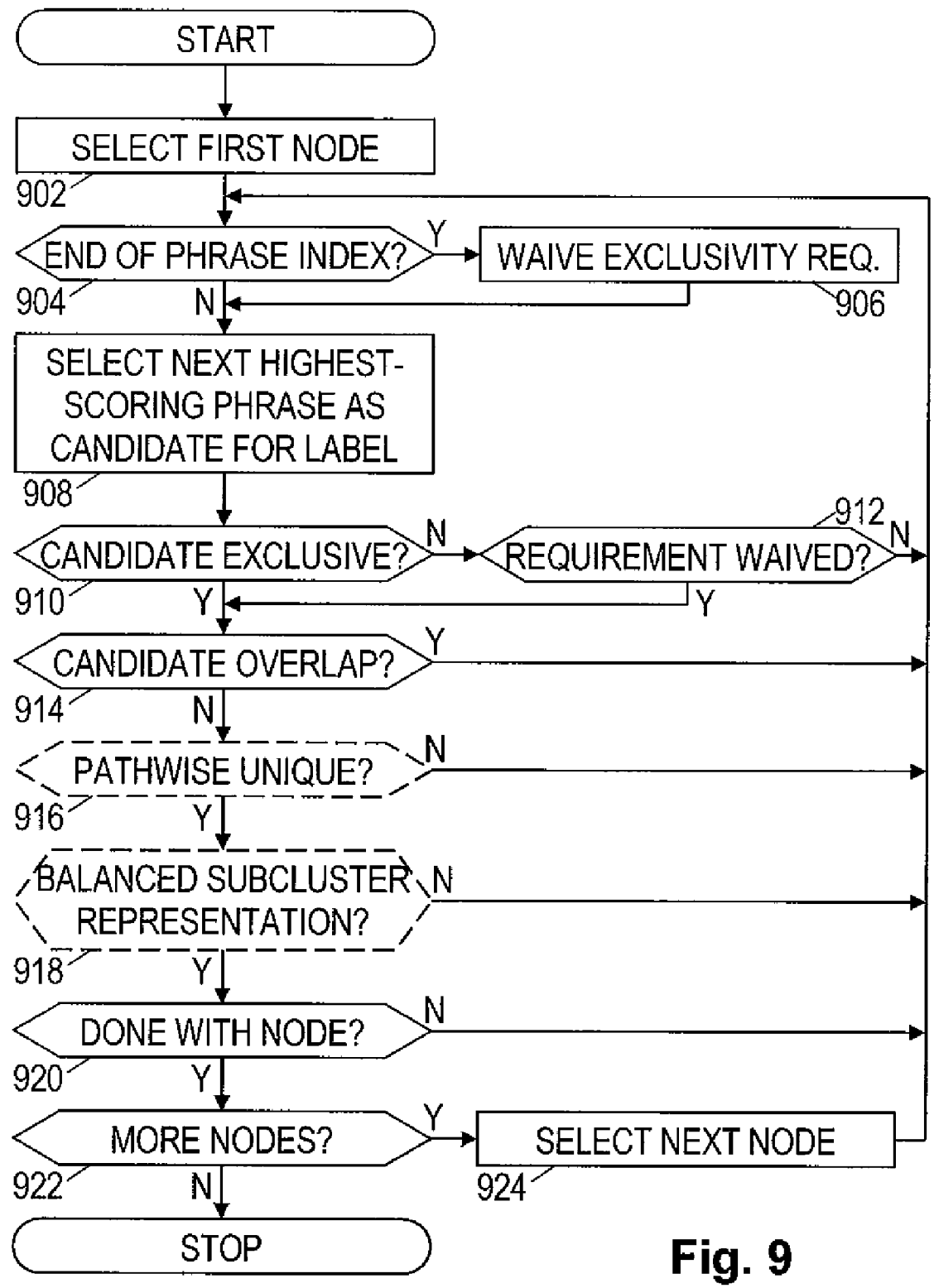
FIG. 9 shows a flow diagram of an illustrative cluster-naming method.

FIG. 9 shows an illustrative cluster-naming process. The process iterates systematically through the clustering tree, proceeding either in a bottom-up fashion (processing all nodes at a given depth in the tree before progressing closer to the root node) or in a top-down fashion. Beginning with block 902, the information exploration system selects a first node of the clustering tree. Blocks 904-924 represent a loop that is executed to iterate through the master phrase index, restarting at the beginning of the phrase index each time a new node is selected. In block 904, the information exploration system tests whether the end of the index has been reached without selecting enough representative phrases for the current node. If so, a flag is set in block 906 to waive the exclusivity requirement, and the loop iterations are restarted at the beginning of the phrase index.

In block 908, the information exploration system 100 selects the highest scoring, previously unselected phrase for the current node as a candidate phrase. As discussed previously, the scoring strategy may be designed to create a selection preference for longer phrases. Alternatively, a strict rule may be enforced on phrase length, restricting representative phrases to a length between two and five significant words, inclusive. Throughout the phrase indexing process, each indexed phrase may be associated with at least one pointer to a document where the original phrase (i.e., before document cleaning and stemming operations) appears. When an indexed phrase is selected as a representative phrase, the information exploration system 100 provides an example of the original phrase as part of the cluster label.

In block 910, the information exploration system 100 tests the phrase exclusivity, i.e., whether the phrase appears in any leaf nodes that are not descendants of the current node. If the phrase is not exclusive, the information system determines in block 912 whether the exclusivity requirement has been waived and replaced by more relaxed coverage test, e.g., whether the phrase's coverage of the leaves of the current node is at least 20% higher than that phrase's coverage of leaves that are not descendants of the current cluster. If the exclusivity requirement has not been waived or the more relaxed coverage requirement is not satisfied, then the information exploration system returns to block 904.

Conversely, if the exclusivity or more relaxed coverage requirements are satisfied, then in block 914 the information exploration system 100 compares the candidate phrase to previously selected representative phrases for the current node. If the newly selected representative phrase is a superstring of one or more previously selected phrases, the one or more previously selected phrases are dropped unless the difference in cluster coverage exceeds a predetermined threshold, e.g., 20%. For example, if the newly selected phrase "chairman of the board" has a leaf cluster coverage of 30%, and the previously selected phrases "chairman" and "board" have leaf cluster coverages of 35% and 75%, respectively, the previously selected phrase "chairman" would be dropped and the previously selected phrase "board" would be retained due to the difference in leaf cluster coverage.

In block 914, the information exploration system 100 also determines whether the newly selected phrase has more than 60% of its significant words (i.e., words that are not stop words) appearing in any one previously selected phrase. If so, the newly selected phrase will be dropped. Of course, the overlap threshold is programmable and can be set to other values. If the candidate is dropped, the information exploration system returns to block 904.

If the previous tests are satisfied, the information exploration system 100 may further apply a test for path-wise uniqueness in optional block 916. In optional block 916, the information exploration system 100 drops candidate phrases that are path-wise non-unique. When the process proceeds in a top-down fashion, the current node represents one end of a path from the root node. To aid in the exploration of the document set, the representative phrases used to label clusters preferably change as the clusters become smaller and more focused. Accordingly, the information exploration system 100 in block 916 drops phrases from the phrase index if those phrases have already been selected as representative of a previous cluster in the path. Thus a user, in following any given path from root node to leaf node in the clustering tree, will not encounter any representative phrase more than once, making the representative phrases "path-wise" unique.

Other uniqueness tests could be used. For example, in a bottom-up process, the information system may drop phrases from the phrase index if those phrases have been selected as representative of any subordinate clusters of the current clusters, i.e., "descendants" in the tree such as children, grandchildren, etc. When clustering quality is high, the uniqueness of the representative phrases is expected to be inherent in the exclusionary phrase indices, and accordingly, block 916 may be treated as an optional operation.

In optional block 918, the information exploration system 100 determines whether one or more sub-clusters are being underrepresented by the selected phrases. For example, if five representative phrases are to be selected to represent a given cluster, and all of the five phrases that have been selected have less than 10% coverage of a given sub-cluster's leaves, the newly selected phrase may be dropped in favor of the next highest-scoring phrase having at least a 25% coverage of the given sub-cluster's leaves. The representation thresholds are programmable and may be allowed to vary based on cluster size. In at least some embodiments, at least one "slot" is reserved for each sub-cluster to assure that none of the sub-clusters go without representation in the cluster label. The number of reserved slots is thus equal to the chosen branching factor for the clustering tree. In some implementations of these embodiments, the reserved slot may be released for general use if a previously-selected phrase provides high coverage of the associated sub-cluster's leaf nodes.

In block 920, the information exploration system determines whether the selection of representative phrases for the current clustering tree node is complete. In some embodiments, this determination is simply a comparison with the desired number of representational phrases for the current node. In other embodiments, this determination is a comparison of the overall coverage of the selected representational phrases to a desired coverage threshold. In still other embodiments, this determination is a comparison of the coverages of selected phrases with coverages of available phrases to determine a rough cost-to-benefit estimate for selecting additional representational phrases.

If the selection is not complete, the information exploration system loops back to block 904. Otherwise the information exploration system 100 determines in block 922 whether there are more nodes in the clustering tree. If so, the information exploration system 100 selects the next node in block 924. If not, the information exploration system terminates the cluster-naming process.

A number of programmable or user-selectable parameters may be tailored for various applications of the disclosed information exploration methods and systems. For example, the leaf cluster size may be altered to provide a trade-off between clustering quality and the number of clusters. The branching factor of the clustering tree and maximum tree depth can be altered to suit user tastes. Similarly, the number of representative phrases can be tailored to trade off between viewing ease and viewable detail. The cluster-naming processes disclosed herein are applicable to any cluster set, irrespective of how that cluster set is obtained. Thus, the disclosed cluster-naming processes can be used with various clustering methods, which in turn can each be based on various similarity measures. Both hierarchical and non-hierarchical clustering methods can be used, though the information exploration system 100 may be expected to perform best with mutually exclusive cluster sets, i.e., sets of clusters that do not have any documents in more than one cluster.

Numerous other variations and modifications will become apparent to those skilled in the art once the above disclosure is fully appreciated. It is intended that the following claims be interpreted to embrace all such variations and modifications.

What is claimed is:

1. A computer-implemented information exploration method that comprises:

processing a set of documents with a computer to identify a hierarchy of clusters of documents, wherein the processing comprises:

calculating a pseudo-document vector for each document in the set of documents; and computing the hierarchy of clusters from the pseudo-document vectors; and selecting with a computer one or more phrases from the set of documents as representative phrases for each cluster from a root cluster to leaf clusters in the hierarchy of clusters,
wherein the selecting comprises:
constructing a phrase-to-leaf node index for the hierarchy of clusters, wherein the phrase-to-leaf node index includes a list of phrases that occur in at least a predetermined number of documents of at least one of the leaf clusters, and for each phrase in the list of phrases, the phrase-to-leaf node index identifies each of the leaf clusters containing the phrase; and
wherein constructing the phrase-to-leaf node index further comprises:
constructing a suffix tree for each leaf cluster in the hierarchy of clusters;
constructing a phrase index for each leaf cluster that includes a list of phrases shared by at least the predetermined number of documents in the leaf cluster; and
combining the phrase indices of the leaf clusters in the hierarchy of cluster to construct the phrase-to-leaf node index.

2. The method of claim 1, wherein the selecting comprises: selecting a predetermined number of phrases that are pathwise unique.

3. The method of claim 1, wherein the selecting comprises: selecting a predetermined number of phrases having a balanced representation of any subordinate clusters.

4. The method of claim 1, wherein the selecting comprises: determining a score for each phrase; and
selecting a predetermined number of highest-scoring phrases.

5. The method of claim 4, wherein the score is a function of phrase length absent any stop words.

6. The method of claim 4, wherein the score is a function of at least one factor in the set consisting of document coverage, leaf cluster coverage, phrase frequency, and phrase-vector-to-cluster-centroid similarity.

7. The method of claim 4, wherein the score is a function of phrase-vector-to-cluster-centroid similarity.

8. The method of claim 1, wherein the representative phrases for any given cluster are indicated by the phrase-to-leaf node index to be absent from any leaf nodes that are not descendants of the given cluster.

9. The method of claim 1, further comprising:
providing an interactive user interface that represents the set of documents as one or more clusters of the hierarchy of clusters that can be selected to reveal smaller clusters, each of which can be selected in turn to reveal still smaller clusters.

10. The method of claim 9, wherein the user interface provides a corresponding representation for each displayed cluster, wherein the representation comprises the representative phrases for the cluster.

11. The method of claim 10, wherein the representation for a displayed cluster comprises a hypertext link.

12. The method of claim 9, wherein the user interface displays titles of documents in a user-selected cluster if the user-selected cluster is a leaf cluster in the hierarchy of clusters.

13. The method of claim 1, wherein the computing comprises a bisecting K-means clustering operation.

14. The method of claim 1, wherein the computing comprises at least one clustering operation from a set consisting of suffix tree clustering, divisive hierarchical clustering, agglomerative hierarchical clustering, K-means clustering, Buckshot clustering, Fractionation clustering.

15. An information exploration system that comprises:
a display;
a user input device;
a memory that stores software; and
a processor coupled to the memory to execute the software, wherein the software configures the processor to interact with a user via the display and user input device, and wherein the software further configures the processor to:
process a set of documents to identify a hierarchy of mutually exclusive clusters of documents;
determine a phrase index for the hierarchy of clusters, wherein the phrase index includes a list of phrases that occur in at least a predetermined number of documents of at least one leaf clusters in the hierarchy of mutually exclusive clusters, and for each phrase in the list of phrases, the phrase index identifies each leaf cluster containing the phrase;
select one or more phrases from the phrase index as representative phrases for each cluster in the hierarchy of clusters, wherein phrases of the phrase index that have already been selected as a representative phrase of a previous cluster in a given path in the hierarchy of clusters are removed from the phrase index for other clusters in the path; and
display the representative phrases as cluster labels on the display.

16. The information exploration system of claim 15, wherein the representative phrases are indicated by the phrase index to only be present in leaf clusters that are decedents of a given cluster.

17. The information exploration system of claim 15, wherein as part of selecting representative phrases for a cluster, the software configures the processor to provide a balanced representation of immediate sub-clusters of that cluster.

18. The information exploration system of claim 15, wherein as part of selecting representative phrases for each cluster, the software configures the processor to determine a score for each phrase.

19. The information exploration system of claim 18, wherein the score is a function of at least one factor in the set consisting of document coverage, leaf-node coverage, phrase frequency, and phrase-vector-to-cluster-centroid similarity.

20. Application instructions on an information storage medium, wherein the instructions, when executed, effect an information exploration interface, the application instructions comprising:
a clustering process that determines a hierarchy of clusters for a set of documents by initially treating the set of documents as a single cluster and iteratively dividing the single cluster and sub-clusters created by the dividing until stopping criteria is met;
a cluster-naming process that selects representative phrases for each cluster in the hierarchy of clusters,
wherein the cluster-naming process selects representative phrases by:
determining a phrase index for the hierarchy of clusters, wherein the phrase index includes a list of phrases that occur in at least a predetermined number of documents of at least one leaf clusters in the hierarchy of clusters, and for each phrase in the list of phrases, the phrase index identifies each leaf cluster containing the phrase;
scoring each phrase in the phrase index; and selecting representative phrases from the phrase index, wherein the representative phrases for any given cluster are indicated by the phrase index to be absent from any leaf nodes that are not descendants of the given cluster; and an exploration process that interactively displays the representative phrases from the phrase index to a user.

21. The application instructions of claim 20, wherein the scores are a function of at least one factor in the set consisting of document coverage, leaf-node coverage, phrase frequency, and phrase-vector-to-cluster-centroid distance.

22. The application instructions of claim 20, wherein as part of selecting representative phrases, the application instructions remove phrases of the phrase index for other clusters in a given path in the hierarchy of clusters that have already been selected as a representative phrase of a previous cluster in the path.

23. The application instructions of claim 20, wherein as part of selecting representative phrases, the application instructions ensure that the representative phrases are also balanced representations of sub-clusters.

24. The application instructions of claim 20, wherein the stopping criteria is based on one of reaching a desired number of clusters or an average clustering error falling below a threshold.

25. A computer-implemented information exploration method that comprises:

processing a set of documents with a computer to identify a hierarchy of mutually exclusive clusters of documents;

creating a phrase index for the hierarchy of mutually exclusive clusters with a computer, wherein the phrase index includes a list of phrases that occur in at least a predetermined number of documents of at least one leaf clusters in the hierarchy of mutually exclusive clusters, and for each phrase in the list of phrases, the phrase index identifies each leaf cluster containing the phrase; and selecting with a computer one or more phrases from the phrase index as representative phrases for each cluster in the hierarchy of mutually exclusive clusters, wherein the representative phrases for any given cluster are indicated by the phrase index to be absent from clusters that are not descendants of the given cluster in the hierarchy of mutually exclusive clusters.

26. The method of claim 25, wherein the selecting comprises:

determining a score for each phrase; and selecting a predetermined number of highest-scoring phrases that satisfy an exclusivity criterion.

\* \* \* \* \*